(No Model.) 2 Sheets—Sheet 1.

M. C. GREENHILL.
OSCILLATING LIQUID METER.

No. 496,934. Patented May 9, 1893.

WITNESSES.
W<sup>m</sup> Munn Andrew.
E. C. Barker.

INVENTOR.
Matthew Cranswick Greenhill
by Fairfax & Wetter
Attorneys.

(No Model)
2 Sheets—Sheet 2.

M. C. GREENHILL.
OSCILLATING LIQUID METER.

No. 496,934.
Patented May 9, 1893.

WITNESSES.
Wm Munn Andrew.
E. C. Barker.

INVENTOR
Matthew Cranswick Greenhill
by Fairfax & Netter
Attorneys.

THE NORRIS PETERS CO., PHOTO-LITHO., WASHINGTON, D. C.

UNITED STATES PATENT OFFICE.

MATTHEW CRANSWICK GREENHILL, OF LONDON, ENGLAND.

OSCILLATING LIQUID-METER.

SPECIFICATION forming part of Letters Patent No. 496,934, dated May 9, 1893.

Application filed May 17, 1892. Serial No. 433,380. (No model.) Patented in England October 14, 1891, No. 17,545, and in France July 20, 1892, No. 223,120.

*To all whom it may concern:*

Be it known that I, MATTHEW CRANSWICK GREENHILL, a subject of the Queen of England, residing at 8 Romola Road, Tulse Hill, London, in the county of Surrey, England, have invented certain new and useful Improvements in Liquid-Meters, (for which I have obtained Letters Patent in France, dated July 20, 1892, No. 223,129, and have applied for British Letters Patent by an application dated October 14, 1891, No. 17,545,) of which the following is a specification.

The object of my invention is to produce an improved appliance for measuring the flow or quantity of liquids—or free flowing substances—such as may be delivered from a main source of supply to the apparatus.

The apparatus is automatic in action, cheap in construction, and not liable to get out of order.

The apparatus consists of a receptacle containing two divisions, made of cast or sheet metal or other suitable material, supported on pivots or axles at its bottom or lower portion in such a manner as to be capable of oscillation upon the said pivots. By adjusting the point of the pivotal supports relatively to the receptacle, the latter is adapted to oscillate, within a given arc, so that the length of the arc may be varied to vary the amount of liquid passed at each oscillation. Liquid is admitted to each division alternately, and by means of suitable valves the liquid to be measured is discharged at each oscillation. By a suitable integrating or counting device, the number of oscillations or volumes of liquid, are shown or recorded on dials or otherwise. The receptacle is mounted within a tank or casing, having steps or bearings for the pivots or axles, and the tank may also connect to the liquid supply and discharge pipes.

In the further description of the invention, reference is made to the accompanying drawings in which—

Figure 1:
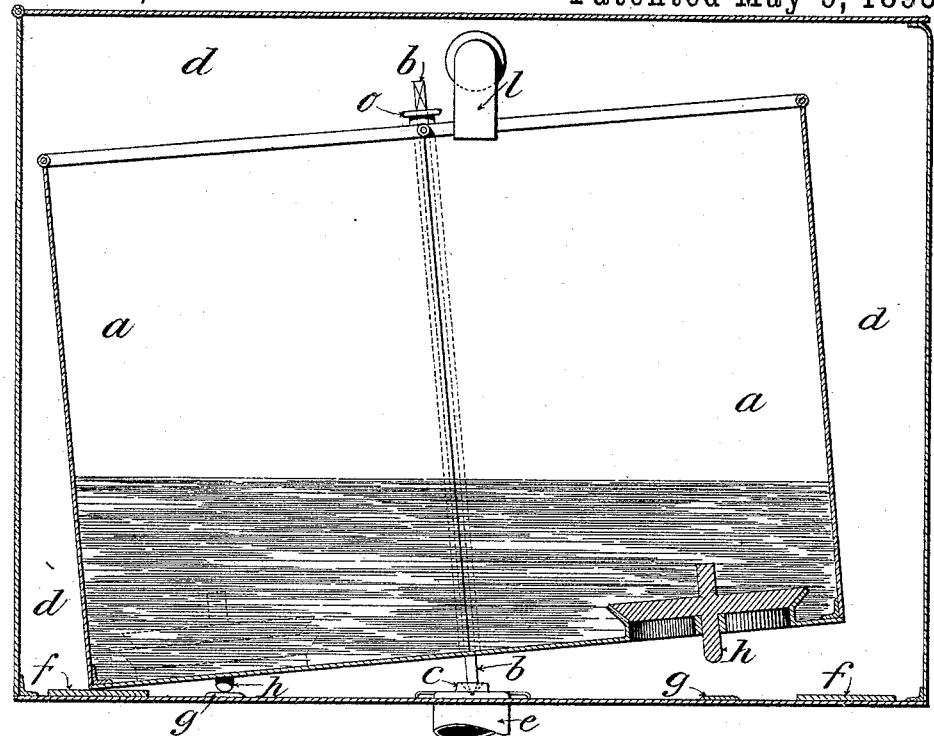
Figure 2:
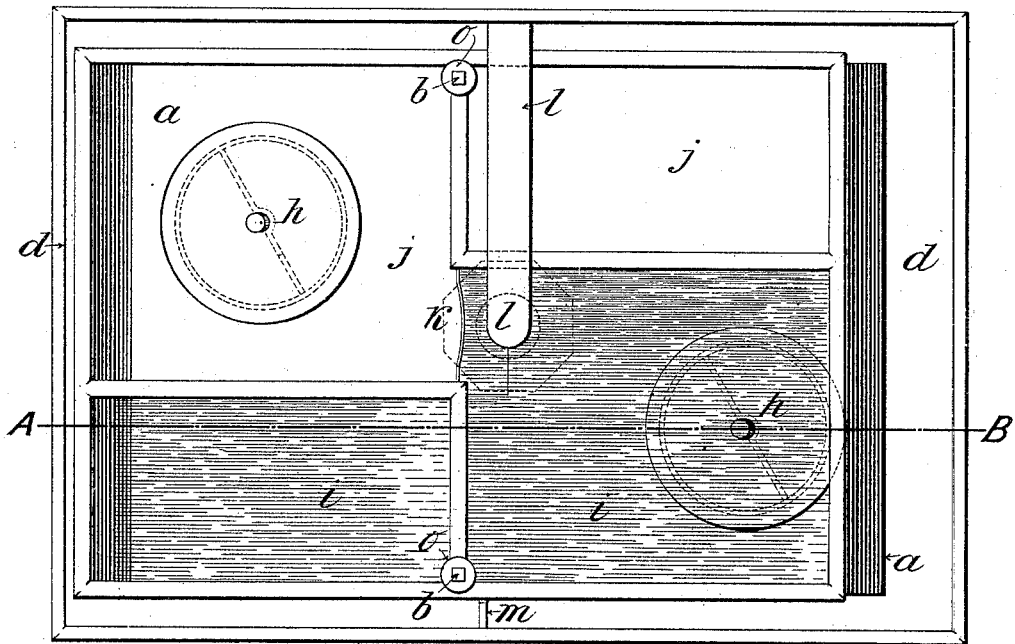
Figure 3:
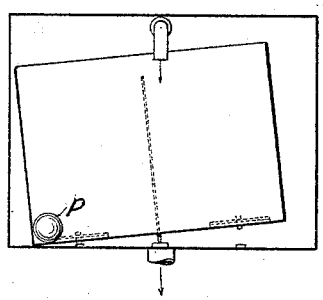
Figure 4:
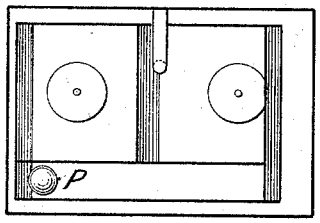
Figure 5:
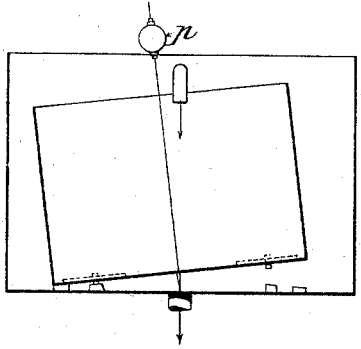

Figure 1 is a vertical section through the apparatus, and Fig. 2 is a plan of the apparatus; Fig. 1 being taken on the line A—B shown in Fig. 2. Fig. 3 is a sectional diagram of an arrangement of meter where a rolling or sliding weight, or moving liquid, is free to move from one end to the other, in a space separate from the liquid to be measured. Fig. 4 is a plan of Fig. 3, also in diagram; and Fig. 5 is a sectional diagram of a meter having an upper weight vertically adjustable to a fixed rod.

Fig. 1 shows a vertical section through an oscillating receptacle or meter $a$, partially supported on pivotal rods $b$, $b$, upon a step $c$ beneath each rod. The steps $c$, $c$, are situated at or near the bottom of a tank or casing $d$, having an outlet pipe $e$ to carry off the liquid after it has been measured in the meter $a$ and discharged therefrom. At the bottom of the tank $d$ is sometimes placed a resting plate or surface $f$ across each end for the edge of the meter $a$ to rest upon, and also striking plates $g$, $g$. One of these striking plates is placed beneath the spindle of a valve $h$ situated in each of two compartments $i, j$ (shown in Fig. 2) formed in the meter $a$. These compartments are arranged longitudinally, and of equal capacity, but as regards the outline of their ends are not necessarily symmetrical.

In the plan, Fig. 2, the compartment $i$ contains water, and it is shown as being made wider at the right hand half than at the left. The partition plate forming the two compartments is bent transversely in the center $k$, of the meter $a$, to connect the wide end of the compartment $i$ with the narrow end, and reversely as regards the other compartment $j$. The partition at $k$ is not carried up quite so high, and is without the roll or capping shown on the edge of other top portions of the sheet metal. A pipe $l$, with a bent end is suspended over the center of the meter $a$ and the partition plate $k$, and the liquid to be measured is supplied through the same.

The action of the meter is as follows: Water, or other liquid, is admitted through the pipe $l$, to the compartment immediately beneath it, (in Figs. 1 and 2 shown as $i$,) and it rises therein until the center line of gravity is gradually shifted from the left or narrow side toward the right. As soon as a sufficient weight of water is accumulated on the right side of $i$ to overcome the weight on the left, and to shift the center of gravity beyond the line joining the pivots $b$, $b$, the meter $a$ tilts over to the right and falls upon the right hand resting plate $f$. At the same time, the spindle of the right hand valve $h$ strikes upon its striking plate $g$, thus lifting the valve from its seat, and liberating the liquid from $i$ into the tank $d$, from which it escapes through the outlet pipe $e$. When the contents of the compartment $i$ are escaping in the manner just described, the other compartment $j$ is filling up from the supply pipe $l$, and this continues until the center line of gravity is shifted past the pivots $b, b$, to the left, and the meter tilts over to the left again—the position shown in Figs. 1 and 2. At each oscillation the supply of liquid is accurately cut or spilt by the thin partition plate $k$ at the center of oscillation, so that an equal quantity of liquid is supplied to each compartment. Any adjustment for quantity is made by screwing the pivotal rods $b, b$, within the nut $o$, which is made fast to the meter $a$ so as to alter its angle (and length of arc)—and therefore the level and volume of the liquid—at the moment of tilting. At every oscillation, a pin $m$, on the outer part of the meter $a$, (Fig. 2,) serves to actuate a suitable counting or integrating device, and the amount of liquid discharged being known, the number of such discharges will indicate the quantity passed.

The partition plate $k$ may extend directly across the meter $a$ along the line between the two pivots $b, b;$ or in a diagonal direction; but the arrangement shown in Fig. 2 is preferred. The point at which tilting takes place may be controlled or modified by a moving counter weight $p$ as in Figs. 3 and 4, or by a fixed counterweight $p$ as in Fig. 5. The latter weight is adjustable for height only, to vary the quantity of the liquid, but the counterweight $p$ in Figs. 3 and 4 may take the form of a liquid, or sand, or shot, or a solid weight moving in a channel or compartment attached to the meter $a$. An axle in a suitable bearing may be substituted for each pivot $b$ and step $c$, if desired.

What I claim, and desire to secure by Letters Patent of the United States, is—

In a liquid meter, the combination of an oscillating measuring vessel $a$ containing two compartments $i, j$ and having a discharge valve $h$ in each compartment, with pivotal rods $b, b$, adjustable in nuts $o, o$ secured to the vessel $a$ and whose pivotal points rest upon steps $c, c$ situated beneath the vessel $a$, and a tank $d$ inclosing the said vessel $a$ and having on its bottom part the said steps $c, c$ an outlet pipe $e$, and striking plates $g, g$, substantially as and for the purpose herein shown and described.

In testimony whereof I have signed this specification in the presence of two subscribing witnesses.

MATTHEW CRANSWICK GREENHILL.

Witnesses:
W. B. MARTIN,
E. C. BARKER.